United States Patent
Suduwa et al.

(10) Patent No.: US 11,209,605 B2
(45) Date of Patent: Dec. 28, 2021

(54) OPTICAL FIBER RIBBON, DIE, AND METHOD OF MANUFACTURING OPTICAL FIBER RIBBON

(71) Applicant: SUMITOMO ELECTRIC INDUSTRIES, LTD., Osaka (JP)

(72) Inventors: Deva Omalka Vayanthi Suduwa, Osaka (JP); Shinji Egawa, Osaka (JP); Yohei Suzuki, Osaka (JP); Ken Takahashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/626,950

(22) PCT Filed: Apr. 12, 2019

(86) PCT No.: PCT/JP2019/015999
§ 371 (c)(1),
(2) Date: Dec. 27, 2019

(87) PCT Pub. No.: WO2020/208816
PCT Pub. Date: Oct. 15, 2020

(65) Prior Publication Data
US 2021/0055492 A1 Feb. 25, 2021

(51) Int. Cl.
*G02B 6/44* (2006.01)
(52) U.S. Cl.
CPC ................... *G02B 6/448* (2013.01)
(58) Field of Classification Search
None
See application file for complete search history.

(56) References Cited

U.S. PATENT DOCUMENTS

| 2004/0146255 A1 | 7/2004 | Ishikawa et al. |
| 2006/0198587 A1 | 9/2006 | Lee |
| 2010/0296781 A1* | 11/2010 | Sato ............... G02B 6/4495 385/114 |

FOREIGN PATENT DOCUMENTS

| JP | 11-183768 | 7/1999 |
| JP | 2004-206048 A | 7/2004 |
| JP | 2009-163045 A | 7/2009 |
| JP | 2011-022477 A | 2/2011 |
| JP | 2011-150183 A | 8/2011 |
| JP | 2013-205501 A | 10/2013 |
| JP | 2016-206499 A | 12/2016 |

* cited by examiner

*Primary Examiner* — Chad H Smith
(74) *Attorney, Agent, or Firm* — Faegre Drinker Biddle & Reath LLP

(57) ABSTRACT

An optical fiber ribbon in which a plurality of optical fibers are integrated by a common coated layer includes: an intermittent connection portion in which a connection portion formed from the common coated layer and a non-connection portion including no common coated layer are alternately formed in a longitudinal direction between every predetermined number of optical fibers equal to or greater than two; and a continuous connection portion in which a connection portion formed from the common coated layer is continuously formed in a longitudinal direction between optical fibers other than the predetermined number of optical fibers equal to or greater than two. A thickness of the connection portion of the intermittent connection portion is thinner than a thickness of the continuous connection portion.

3 Claims, 5 Drawing Sheets

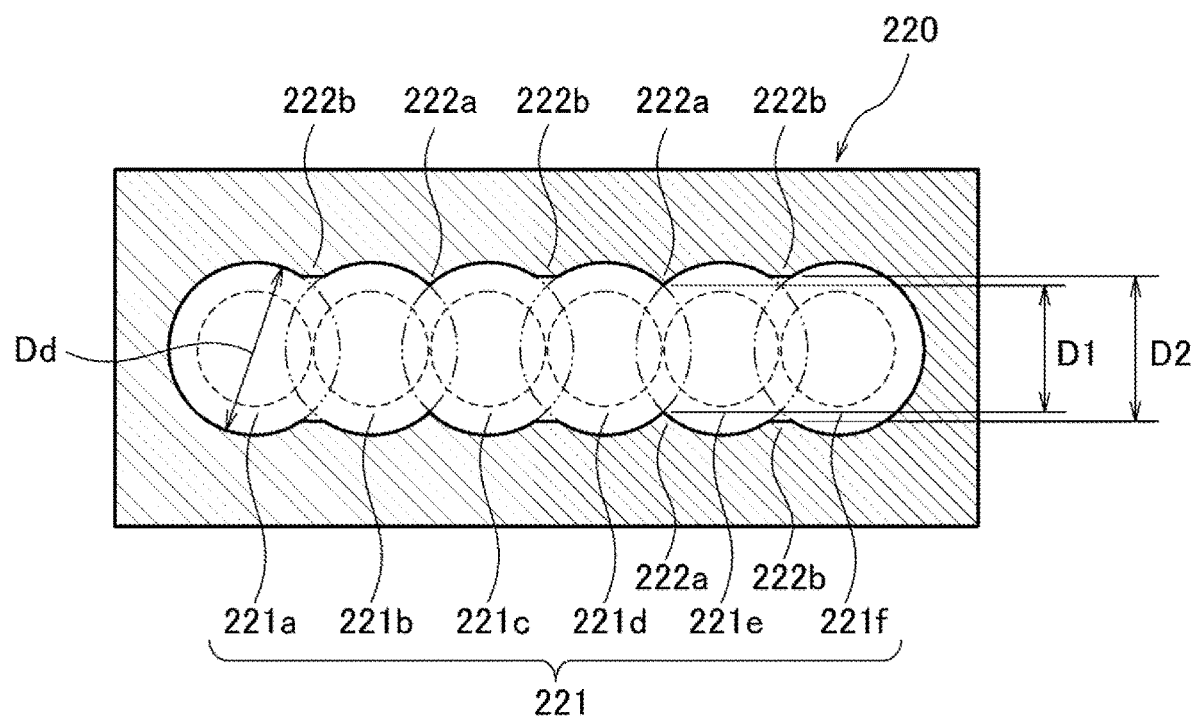
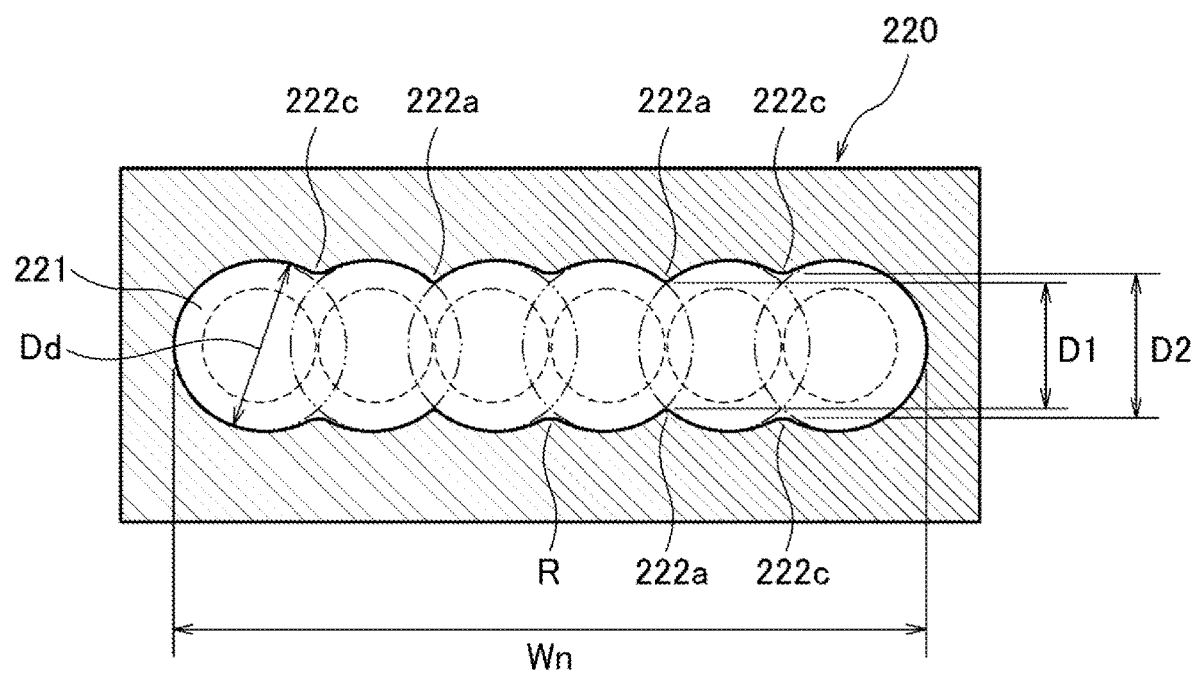

D1 < D2

D1' < D1 < D2

D1"<D1'<D1<D2

OPTICAL FIBER RIBBON, DIE, AND METHOD OF MANUFACTURING OPTICAL FIBER RIBBON

TECHNICAL FIELD

The present disclosure relates to an optical fiber ribbon, a die, and a method of manufacturing the optical fiber ribbon.

This application claims priority to and benefit of Japanese Patent Application No. 2017-200465, filed on Oct. 16, 2017, which is hereby incorporated by reference in its entirety.

BACKGROUND ART

Patent Literature 1 discloses a method of manufacturing an optical fiber ribbon in which outer surfaces of a plurality of optical fibers parallelized in a mutually contact state are integrated by a common coated layer, and setting intermittent notches in a longitudinal direction in the common coated layer between the adjacent optical fibers.

CITATION LIST

Patent Literature

Patent Literature 1: Japanese Patent Publication No. 2016-206499

SUMMARY OF INVENTION

According to the present disclosure, there is provided an optical fiber ribbon in Which a plurality of optical fibers are integrated by a common coated layer. The optical fiber ribbon includes: an intermittent connection portion in which a connection portion formed from the common coated layer and a non-connection portion including no common coated layer are alternately formed in a longitudinal direction between every predetermined number of optical fibers equal to or greater than two; and a continuous connection portion in which a connection portion formed from the common coated layer is continuously formed in a longitudinal direction between optical fibers other than the predetermined number of optical fibers equal to or greater than two. A thickness of the connection portion of the intermittent connection portion is thinner than a thickness of the continuous connection portion.

According to the present disclosure, there is provided a die for manufacturing an optical fiber ribbon that includes a plurality of holes in which a plurality of parallelized optical fibers passes. The plurality of mutually adjacent holes communicate with each other. In spaces formed between the plurality of mutually adjacent holes, first facing portions facing with parallel surfaces of the plurality of optical fibers interposed the first facing portions and second facing portions facing at an interval greater than the first facing portions are formed.

According to the present disclosure, a method of manufacturing an optical fiber ribbon is a method of manufacturing an optical fiber ribbon using the die according to the present disclosure.

BRIEF DESCRIPTION OF DRAWINGS

FIG. 4 is a sectional view illustrating a die according to the embodiment of the present disclosure.

FIG. 5 is a sectional view illustrating a die according to another embodiment of the present disclosure.

DESCRIPTION OF EMBODIMENTS

Technical Problem

Figure 8:
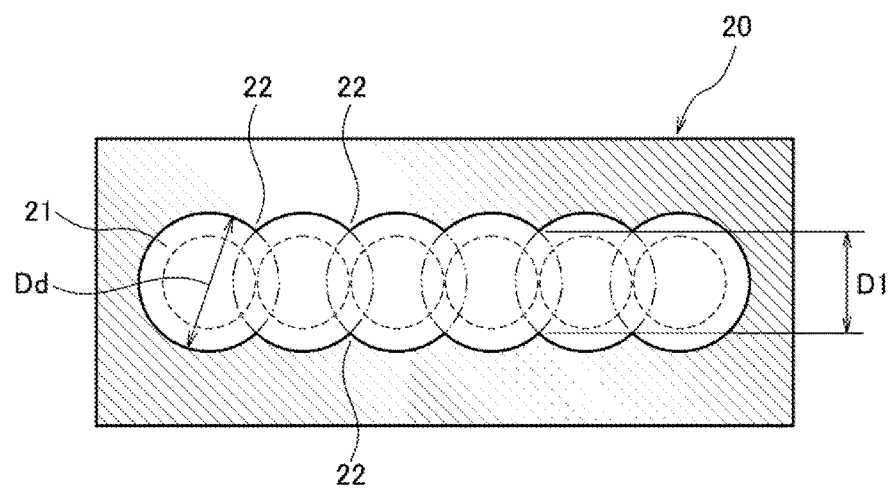
FIG. 8 is a diagram illustrating a cross section of a die used to manufacture an optical fiber ribbon according to the related art.

In a die for an optical fiber ribbon used when outer surfaces of a plurality of optical fibers parallelized in a mutually contact state are integrated by a common coated layer, thicknesses between holes in which optical fibers pass are all the same in the related art. FIG. 8 is a diagram illustrating a cross section of a die used to manufacture an optical fiber ribbon according to the related art. FIG. 8 illustrates, for example, a die for an optical fiber ribbon with six cores. A die 20 is provided with holes 21 with a diameter Dd in which six optical fibers passes in accordance with the number of cores, and the adjacent holes 21 communicate with each other. Convex facing portions 22-22 facing with parallel surfaces of the optical fibers interposed therebetween are formed between the holes 21 in which the optical fibers pass. In the related art, facing distances D1 between the facing portions 22-22 are all the same size. The reason for forming a die space in a convex shape is that the optical fiber ribbon is formed in a shape to facilitate single core separation. The shape of the die space is not necessarily convex, but may be flat.

When a manufacturing linear speed of the optical fiber ribbon is low, the coating thicknesses between cores of the manufactured optical fiber ribbon are substantially the same despite using the device. However, a phenomenon in which the coating thicknesses between the cores of the optical fiber ribbon vary was found when the linear speed is fast. It is because it is considered that when a resin pressure around the optical fiber increases with an increase in the linear speed, disturbance occurs in a flow of a resin, and therefore thick spots and thin spots of coating occur between the ribbons at random. Since a self-centering force works, a coating thickness between the optical fiber ribbons tended to be thicker in a middle portion than at in end portion in a width direction.

Figure 9:
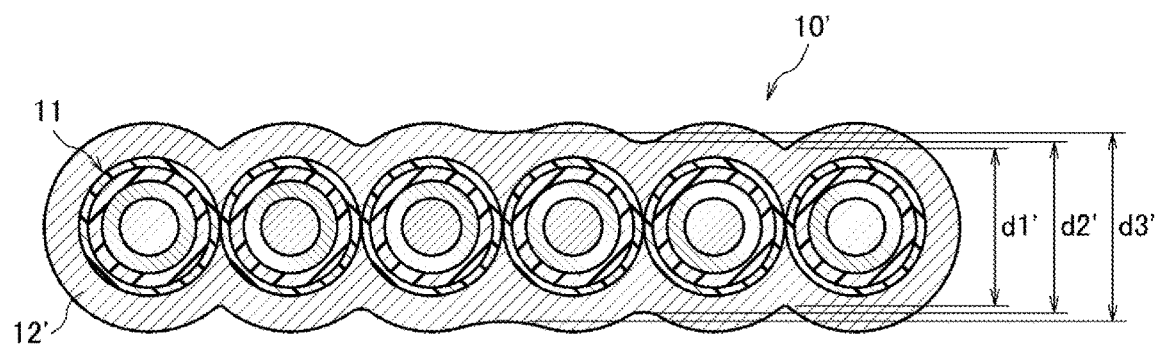
FIG. 9 is a sectional view illustrating an example of an optical fiber ribbon manufactured using the die illustrated in FIG. 8.

FIG. 9 is a sectional view illustrating an example of an optical fiber ribbon manufactured by causing a linear speed to be faster than in the related art using the die illustrated in FIG. 8. In an optical fiber ribbon 10☐ six optical fibers 11 are disposed in parallel and are integrated by a common coated layer 12 made made of a resin, but the thickness of the coated resin layer between the optical fibers 11 is greater in the middle portion than in the end portion in the width direction (where d3 ≥ >d2 ≥ >d1 ). In the optical fiber ribbon 10, it is easy to make cuts in a spot in which the thickness of the common coated layer 12 is thin when an intermittent ribbon is manufactured by making the cuts in predetermined spots between the optical fibers. However, it was difficult to stably make cuts in thick spots of the thickness of the common coated layer 12.

The present disclosure is devised in view of such circumstances and an object of the present disclosure is to provide an optical fiber ribbon appropriate to manufacture an intermittent ribbon, a die for manufacturing the optical fiber ribbon, and a method of manufacturing the optical fiber ribbon using the die.

Advantageous Effects of Present Disclosure

According to the present disclosure, it is possible to provide an optical fiber ribbon appropriate to manufacture an intermittent ribbon, a die for manufacturing the optical fiber ribbon, and a method of manufacturing the optical fiber ribbon using the die.

DESCRIPTION OF EMBODIMENTS OF PRESENT DISCLOSURE

First, embodiments of the present disclosure will be described.

According to an embodiment (1) of the present disclosure, there is provided an optical fiber ribbon in which a plurality of optical fibers are integrated by a common coated layer. The optical fiber ribbon includes: an intermittent connection portion in which a connection portion formed from the common coated layer and a non-connection portion including no common coated layer are alternately formed in a longitudinal direction between every predetermined number of optical fibers equal to or greater than two; and a continuous connection portion in which a connection portion formed from the common coated layer is continuously formed in a longitudinal direction between optical fibers other than the predetermined number of optical fibers equal to or greater than two. A thickness of the connection portion of the intermittent connection portion is thinner than a thickness of the continuous connection portion.

According to the embodiment, the thickness of the common coated layer of the intermittent connection portion for forming the cut is thinner than the thickness of the continuous connection portion in which the cut is not formed. Therefore, when an intermittent ribbon is manufactured, it is easy to make a cut between the optical fibers.

According to an embodiment (2) of the present disclosure, in the optical fiber ribbon described in (1), a difference between the thickness of the continuous connection portion and the thickness of the connection portion of the intermittent connection portion may be at least 20 μm or more.

According to the embodiment, the thickness of the connection portion of the intermittent connection portion is thinner by 20 μm than the thickness of the continuous connection portion. Therefore, when an intermittent ribbon is manufactured, it is easier to make the cut between the fiber ribbons.

According to an embodiment (3) of the present disclosure, there is provided a die for manufacturing an optical fiber ribbon that includes a plurality of holes in which a plurality of parallelized optical fibers passes. The plurality of mutually adjacent holes communicate with each other. In spaces formed between the plurality of mutually adjacent holes, first facing portions facing with parallel surfaces of the plurality of optical fibers interposed the first facing portions and second facing portions facing at an interval greater than the first facing portions are formed.

According to the embodiment, since the first facing portions and the second facing portions facing at a larger interval than the first facing portions are included, the thickness of the common coated layer between the optical fibers can be thin in spots of the first facing portions facing at a narrow interval. Accordingly, when the intermittent ribbon is manufactured, it is easy to make a cut between the optical fiber ribbons in a thin spot of the common coated layer.

According to an embodiment (4) of the present disclosure, in the die described in (3), the first facing portions may be formed in every number of spaces equal to or greater than two and the second facing portion may be formed in the spaces other than the predetermined number of spaces equal to or greater than two.

According to the embodiment, a facing interval of the facing portions in the spaces other than the predetermined number equal to or greater than two is a wide interval. Therefore, in spots of the first facing portions facing at a narrow interval for every predetermined number equal to or greater than two, it is possible to form the thickness of the common coated layer between the optical fibers to be thin. Accordingly, when the intermittent ribbon is manufactured, it is possible to reliably make a cut between the optical fiber ribbons in a thin spot of the common coated layer. For example, when there are two kinds of thicknesses of the facing portions, it is possible to manufacture the intermittent ribbon with the die with a simpler structure.

According to an embodiment (5) of the present disclosure, in the die described in (3) or (4), a difference between a facing distance of the first facing portion and a facing distance of the second facing portion may be at least 50 μm or more.

According to the embodiment, in a spot of the first facing portion facing at a narrow interval, it is easy to thinly form the thickness of the common coated layer between the optical fibers.

According to an embodiment (6) of the present disclosure, in the die described in any one of (3) to (5), the plurality of first facing portions may be included. A correspondence distance of the first facing portion formed in a space of a middle portion in a width direction of parallel surfaces of the plurality of optical fibers may be narrower than the facing distance of the first facing portion formed in a space in an end portion in the width direction.

When a linear speed is fast, a coating thickness between the optical fiber ribbon tends to be thicker between the cores in the middle portion than between the cores in the end portion in the width direction. According to the embodiment, however, since the facing distance of the facing portion of the space in the middle portion of the die is narrower than that the space in the end portion, it is easy to thinly form the thickness of the resin coated layer between the optical fibers formed by the first facing portions facing at a narrow interval.

According to an embodiment (7) of the present disclosure, in the die described in any one of (3) to (6), the second facing portion may be formed in a planar shape.

According to an embodiment (8) of the present disclosure, the die described in any one of (3) to (7) is used for a method of manufacturing an optical fiber ribbon.

According to the embodiment, it is possible to thinly the thickness of the common coated layer between predetermined optical fibers. Accordingly, when the intermittent ribbon is manufactured, it is easy to make the cuts between the optical fiber ribbons.

DETAILS OF EMBODIMENTS OF PRESENT DISCLOSURE

Specific examples of an optical fiber ribbon, a die, and a method of manufacturing the optical fiber ribbon according to embodiments of the present disclosure will be described below with reference to the drawings. The present invention is not limited to the following examples and is intended to include meanings equivalent to the claims described in the claims and all the modifications within the scope of the present invention. The present invention includes combinations of any embodiments as long as the plurality of embodiments can be combined. In the following description, configurations to which the same reference signs are given are similar throughout different drawings and the description thereof will be omitted in some cases.

Figure 1:
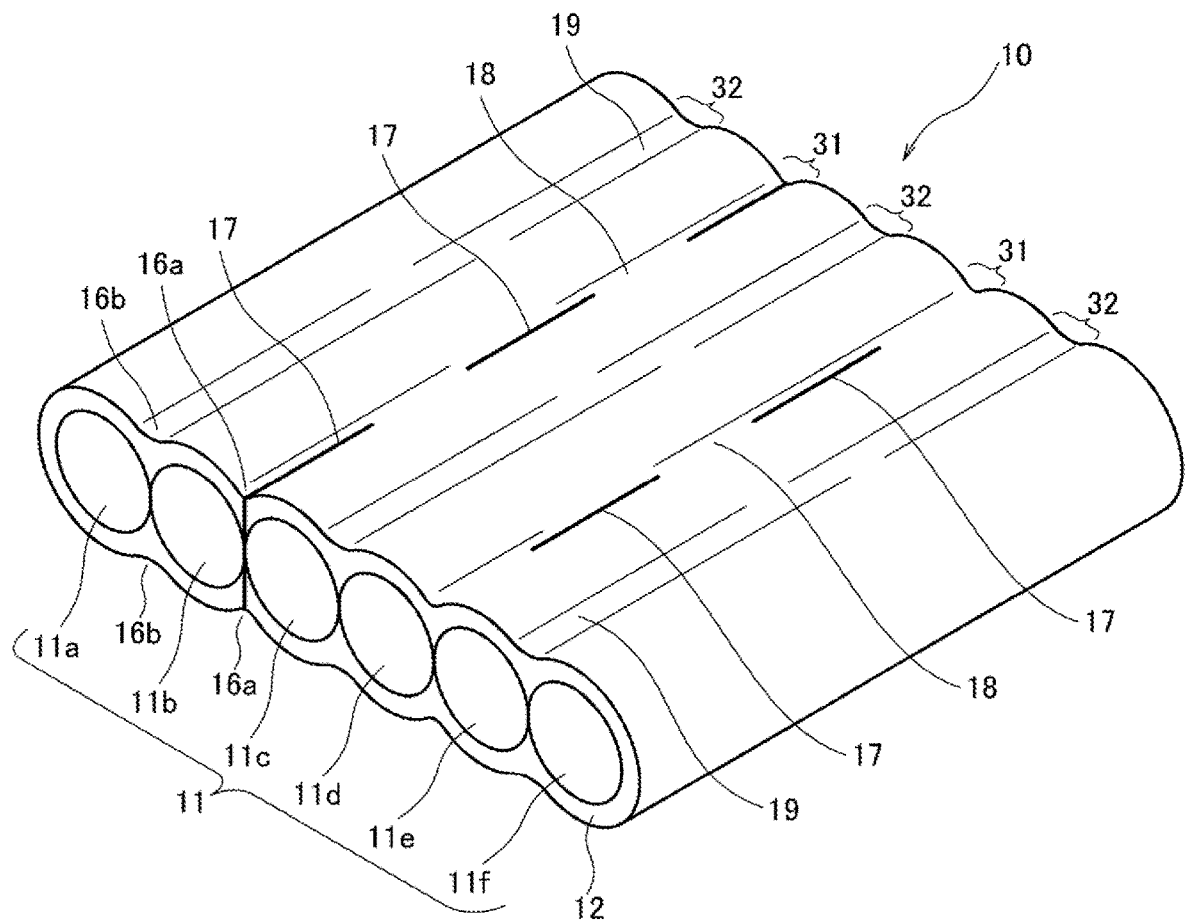
FIG. 1 is a perspective view illustrating an optical fiber ribbon according to an embodiment of the present disclosure.
Figure 2:
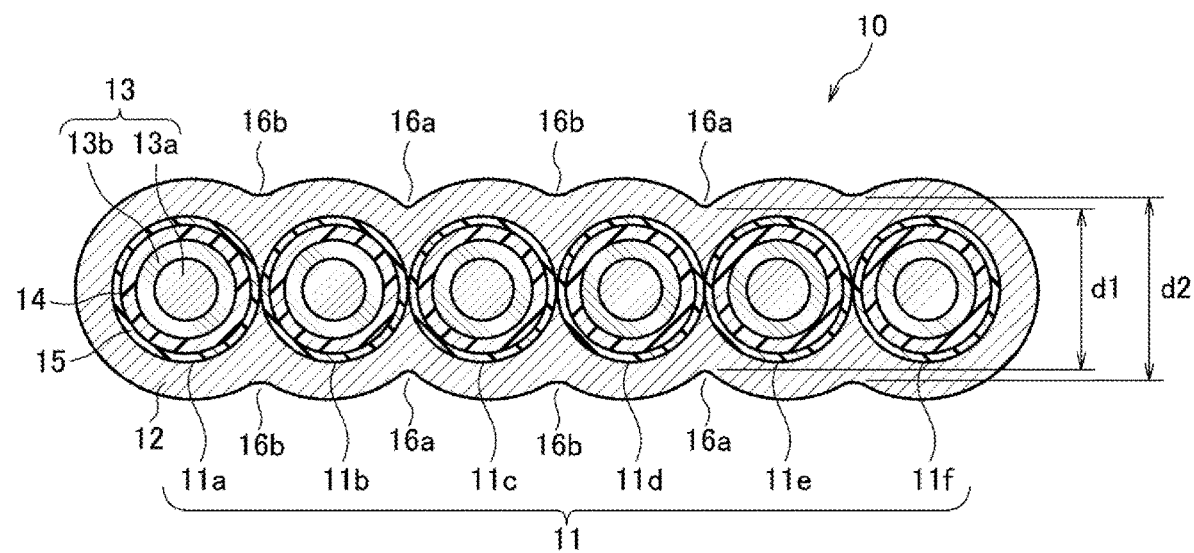
FIG. 2 is a sectional view illustrating the optical fiber ribbon according to the embodiment of the present disclosure.

FIG. 1 is a perspective view illustrating an optical fiber ribbon according to an embodiment of the present disclosure. FIG. 2 is a sectional view illustrating the optical fiber ribbon according to the embodiment of the present disclosure.

In an optical fiber ribbon 10, a plurality of optical fibers, for example, six optical fibers 11 (11a to 11f), are arranged side by side in a line in parallel (parallelized) in a mutually contact state and outer surfaces including upper and lower parallel surfaces are integrated over the entire length by the common coated layer 12 in a tape shape. In FIGS. 1 and 2, the optical fiber ribbon in which the optical fibers 11 come into contact with each other is illustrated, but the optical fibers 11 may not come into contact with each other to be separated.

The optical fiber 11 is an optical fiber that includes a glass fiber 13, a protective coating 14, and a colored layer 15. The glass fiber 13 includes a core 13a and a clad 13b. The outer diameter of the glass fiber 13 is, for example, 125 µm. The protective coating 14 covers the outer circumference of the glass fiber 13. The protective coating 14 can be formed using, for example, an acrylate resin. The colored layer 15 coats the outer circumference of the protective coating 14. The outer diameter of the optical fiber 11 is, for example, around 255 µm. The outer diameter of the glass fiber 13 and the outer diameter of the optical fiber 11 are not limited to the foregoing values, but may be smaller diameters. For example, the outer diameter of the glass fiber 13 may be around 100 µm and the outer diameter of the optical fiber may be around 200 µm. An ultraviolet curable resin or the like can be used for the common coated layer 12, but a thermoplastic resin, a thermosetting resin, or the like can also be used. The protective coating 14 may include two layers.

The optical fiber ribbon 10 according to the embodiment is configured as an intermittent ribbon that is periodically provided with cuts 17 formed in the thickness direction through the common coated layer 12 between every number of optical fibers 11 equal to or greater than two. That is, between the optical fibers 11 in which the cuts 17 are formed, an intermittent connection portion 31 in which a connection portion 18 formed from the common coated layer 12 and a non-connection portion formed from the cut 17 formed through in the thickness direction without including the common coated layer 12 are alternately formed in the longitudinal direction of the optical fiber ribbon 10. Between the optical fibers 11 in which the cuts 17 are not formed, a continuous connection portion 32 in which the connection portion 19 formed from the common coated layer 12 is continuously formed in the longitudinal direction of the optical fiber ribbon 10.

In the example illustrated in FIGS. 1 and 2, the cut 17 is formed between every two optical fibers 11. More specifically, the cuts 17 are formed in the common coated layer 12 between the optical fibers 11b and 11c and between the optical fibers 11d and 11e. Accordingly, inter-optical-fiber portions between the optical fibers 11b and 11c and between the optical fibers 11d and 11e are configured as the intermittent connection portions 31, and other inter-optical-fiber portions between the optical fibers 11a and 11b, the optical fibers 11c and 11d, and the optical fibers 11e and 11f are configured as the continuous connection portions 32.

Depressed portions 16a and 16b in which the common coated layer 12 is hollowed are formed in the common coated layer 12 between the mutually adjacent optical fibers 11. In the embodiment, the inter-optical-fiber depressed portion 16a of the common coated layer 12 between the optical fibers 11b and 11c and between the optical fibers 11d and 11e is formed to be deeper than the inter-optical-fiber depressed portion 16b of the common coated layer 12 between the optical fibers 11a and 11b, between the optical fibers 11c and 11d, and between optical fibers 11e and 11f. Therefore, a thickness d1 of the intermittent connection portion 31 is thinner than a thickness d2 of the continuous connection portion 32.

The depression portions 16a and 16b included in the common coated layer 12 are useful when the optical fiber 11 is split from the optical fiber ribbon 10 and the thickness d1 of the intermittent connection portion 31 is thinner than the thickness d2 of the continuous connection portion 32. Therefore, when an intermittent ribbon is manufactured, it is easy to make cuts between the optical fibers 11. When a difference between the thickness d1 of the intermittent connection portion 31 and the thickness d2 of the continuous connection portion 32 is equal to or greater than at least 20 µm, it is easy to make the cuts between the optical fibers 11.

Figure 3:
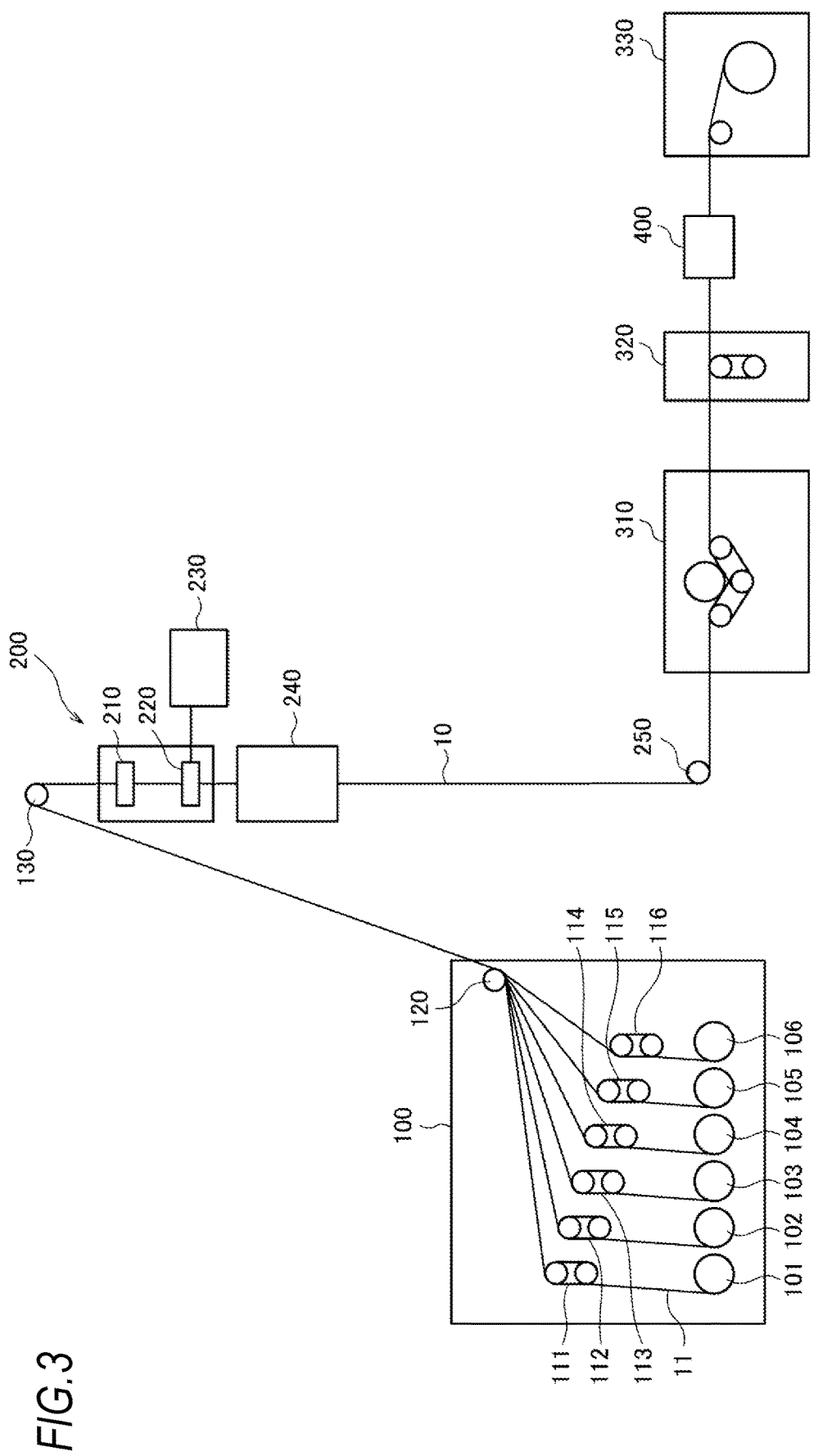
FIG. 3 is a diagram illustrating a method of manufacturing the optical fiber ribbon according to the embodiment of the present disclosure.
Figure 6:
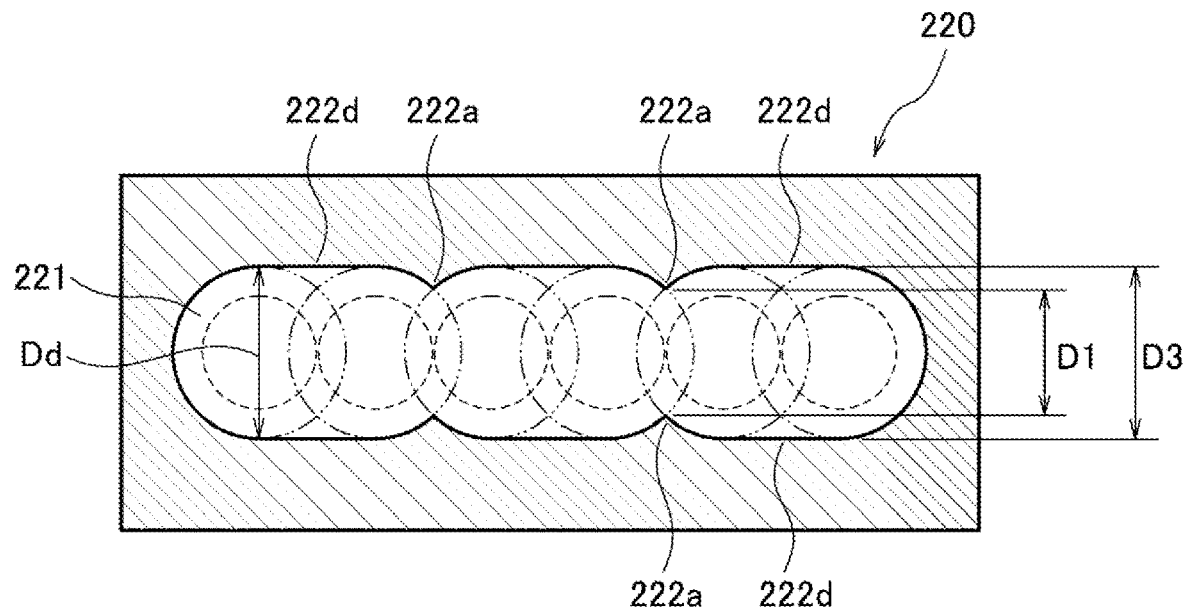
FIG. 6 is a sectional view illustrating a die according to still another embodiment of the present disclosure.

Next, a method of manufacturing the optical fiber ribbon according to an embodiment of the present disclosure will be described. FIG. 3 is a diagram illustrating a method of manufacturing the optical fiber ribbon according to the embodiment of the present disclosure. FIG. 4 is a sectional view illustrating a die according to the embodiment of the present disclosure. FIG. 5 is a sectional view illustrating a die according to another embodiment of the present disclosure. FIG. 6 is a sectional view illustrating a die according to still another embodiment of the present disclosure. Dotted lines in the sectional views of the dies in FIGS. 4 to 6 virtually indicate the positions of the optical fibers.

A manufacturing apparatus for an optical fiber ribbon includes a supply device 100. In the supply device 100, N (in the embodiment, six) reels 101 to 106 corresponding to the number of cores of the optical fiber ribbon 10, N dancer rollers 111 to 116, and a guide roller 120 are provided. The optical fiber 11 is wound around each of the reels 101 to 106. The optical fiber 11 is unreeled from each of the reels 101 to 106, is provided with a tensile force of tens of gf by each of the dancer rollers 111 to 116, and is arranged on one arrangement surface when the optical fiber 11 passes through the guide roller 120. The optical fibers 11 are further concentrated by a right above guide roller 130 and are sent to an application device 200.

The application device 200 includes a nipple 210 and a die 220. The optical fibers 11 are inserted through the application device 200 and the optical fibers 11 are pulled with a predetermined tensile force by a device at the rear stage. Thus, the inserted optical fibers 11 are guided by the nipple 210 to be arranged in a desired form and are sent to the dice 220. Subsequently, an ultraviolet curable resin of which the common coated layer 12 illustrated in FIG. 1 is formed is applied to the circumferences of the parallel optical fibers 11. The ultraviolet curable resin is supplied from a pressure type resin tank 230. The six optical fibers 11 to which the ultraviolet curable resin is applied is irradiated and cured with ultraviolet light by an ultraviolet irradiation device 240. The cured ultraviolet curable resin becomes the common coated layer 12 to form the six-core optical fiber ribbon 10.

The ultraviolet irradiation device 240 irradiates the optical fibers with ultraviolet light, and the cured optical fiber ribbon 10 is sent to a winding device 330 that includes a reel via a guide roller 250, a feeding capstan 310, a winding tensile force control dancer roller 320, and an intermittent processing device 400. In the intermittent processing device 400, for example, periodic cuts formed in the thickness direction in the common coated layer 12 between predetermined optical fibers 11 of the optical fiber ribbon 10 to form the intermittent connection portions 31 of the optical fiber ribbon 10 are made by a cutting roller (not illustrated). Then, in the winding device 330, the optical fiber ribbon 10 which is an intermittent ribbon is wound around the reel via a guide. A winding tensile force of the entire optical fiber ribbon here is set to, for example, tens of gf to hundreds of gf.

Therefore, the optical fiber ribbon 10 exemplified in FIG. 1 is manufactured. The application device 200 may coat a thermoplastic resin as a taping resin for forming the common coated layer 12 rather than an ultraviolet curable resin. Here, the application device 200 includes an extruder that extrudes a thermoplastic resin and a cooling device that cools the extruded resin. In any case, when a resin is cured as fast as possible after the resin passes through the die 220, it is effective to maintain the shape of the optical fiber ribbon 10.

Next, the die 220 will be described. As illustrated in FIG. 4, the die 220 used in the embodiment is provided with, for example, six holes 221 with a diameter Dd through which six optical fibers 11 pass, and the mutually adjacent holes 221 communicate with each other. Dotted lines virtually indicate the optical fibers 11 inserted through the die 220. Portions between the holes 221 include first facing portions 222a-222a facing at a narrow interval with parallel surfaces of the plurality of optical fibers interposed therebetween and second facing portions 222b-222b facing at a wide interval wider than the narrow interval. The first facing portions 222a-222a are formed between every predetermined number of holes equal to or greater than two, in the embodiment, every two holes 221, and the second facing portions 222b-222b are formed between the holes 221 between every other number of holes, that is, every predetermined number of holes equal to or greater than two.

More specifically, in the embodiment, the facing portion 222a-222a between every two spaces, that is, holes 221b and 221c, which is every predetermined number equal to or greater than two and the facing portion 222a-222a between holes 221d and 221e are formed as first facing portions at a narrow facing distance D1. The facing portion 222b-222b between the holes 221a and 221b, the facing portion 222b-222b between the holes 221c and 221d, and the facing portion 222b-222b between the holes 221e and 221f are formed as second facing portions at a facing distance D2 wider than a facing distance D1 of the first facing portion.

In the optical fiber ribbon 10 passing through the die 220 and irradiated and cured with the ultraviolet light, the thickness of the common coated layer 12 between every two optical fibers 11 corresponding to the first facing portion is thinner than the thickness between the other optical fibers 11. Thus, in a process of forming the intermittent connection portion 31, the cuts formed in the thickness direction can easily be made in the portions with the thin thickness of the common coated layer 12 between the optical fibers 11 in the longitudinal direction by the intermittent processing device 400.

In the embodiment, the second facing portions 222b-222b are formed in a planar shape. As in an embodiment illustrated in FIG. 5, second facing portions 222c-222c facing at a facing distance D2 may be formed in a curved shape. As in an embodiment illustrated in FIG. 6, second facing portions 222d to 222d facing at a facing distance D3 substantially equal to the diameter Dd of the hole 221 may be formed in a planar shape while maintaining the distance D3. Since the shape of the die 220 is realized, as described above, and the first facing portion and the second facing portion facing at the interval greater than the first facing portion are provided, the common coated layer 12 between the optical fibers 11 in the spot corresponding to the first facing portion in which the cut is made can be formed thinly. It is preferable to set a difference between the facing distance D1 of the first facing portion and the facing distance D2 of the second facing portion or the facing distance D3 to at least 50 μm or more. By setting the difference between the facing distance D1 and the facing distance D2 or the facing distance D3 to 50 μm or more, for example, it is easy to set a difference between the thickness d2 of the continuous connection portion 32 and the thickness d1 of the connection portion of the intermittent connection portion 31 in the manufactured optical fiber ribbon to be 20 μm or more.

Figure 7A:
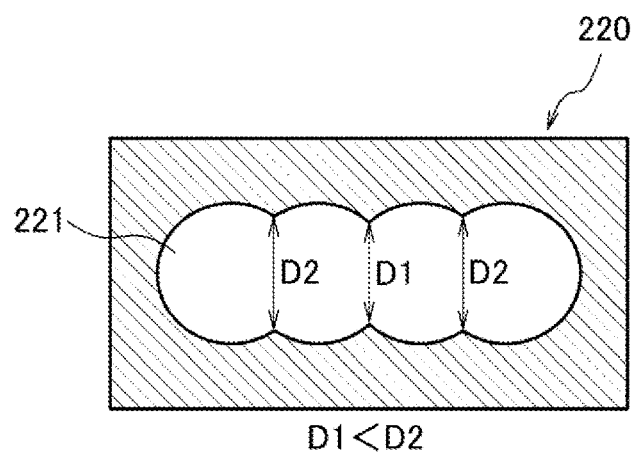
FIG. 7A is a sectional view illustrating a die according to still another embodiment of the present disclosure.
Figure 7B:
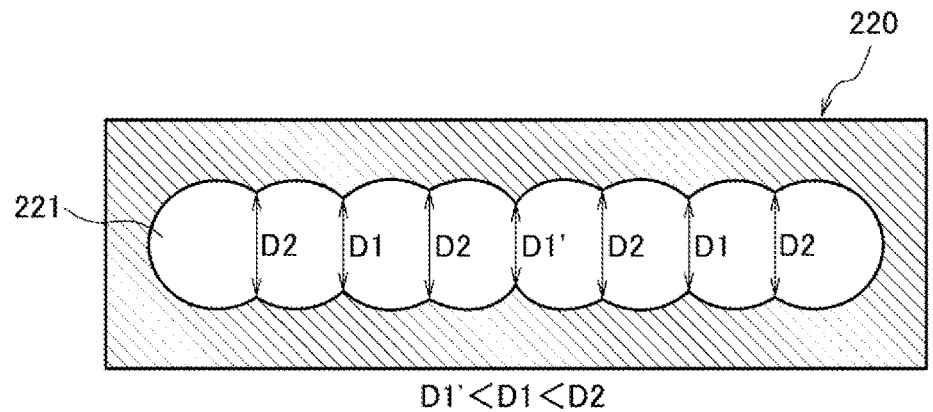
FIG. 7B is a sectional view illustrating a die according to still another embodiment of the present disclosure.
Figure 7C:
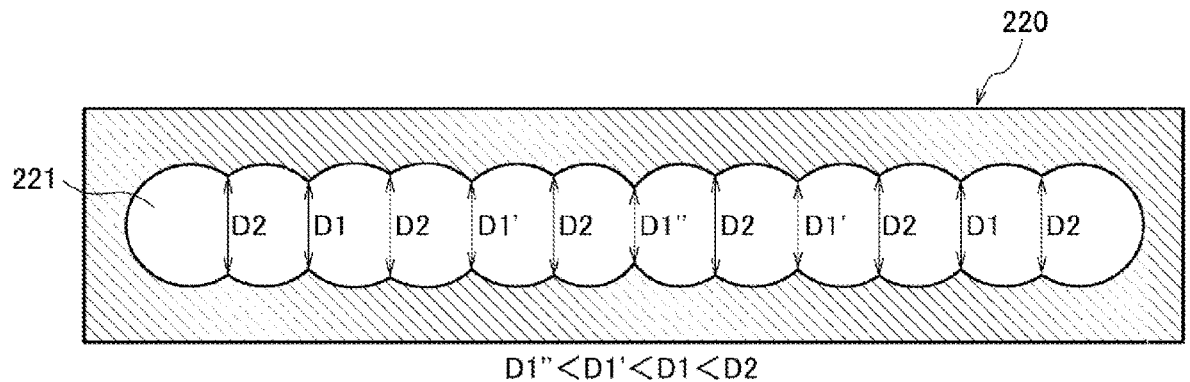
FIG. 7C is a sectional view illustrating a die according to still another embodiment of the present disclosure.

FIGS. 7A to 7C are sectional views illustrating dies according to still other embodiments of the present disclosure. FIG. 7A illustrates a die for manufacturing an optical fiber ribbon of four cores. FIG. 7B illustrates a die for manufacturing an optical fiber ribbon of eight cores. FIG. 7C illustrates a die for manufacturing an optical fiber ribbon of twelve cores. All the dies are used to manufacture the optical fiber ribbons in which an intermittent connection portion is formed between every two optical fibers.

A die 220 for manufacturing an N-core optical fiber ribbon includes N−1 facing portions equivalent to a number between optical fibers. The die 220 for manufacturing a 4-core optical fiber ribbon illustrated in FIG. 7A includes four communicating holes 221 and three facing units. The first facing portion with a narrow facing distance D1 is equivalent to a second facing portion from the left of the drawing and the second facing portions with a wide facing distance D2 is equivalent to first and third facing portions from the left of the drawing.

The die 220 for manufacturing an 8-core optical fiber ribbon illustrated in FIG. 7B is provided with eight communicating holes 221 and seven facing portions. The first facing portions with a narrow facing distance are equivalent to three second, fourth, and sixth facing portions from the left of the drawing and the second facing portions with the wide facing distance D2 are equivalent to four first, third, fifth, and seventh facing portions from the left of the drawing. The first facing portions may be formed so that the width of a middle portion in the width direction is narrower than an end portion in the width direction of the parallel surface of the optical fiber. In the present example, a facing distance D1 of the fourth facing portion is less than the facing distance D1 of the second and sixth facing portions from the left.

Similarly, the die 220 for manufacturing a 12-core optical fiber ribbon illustrated in FIG. 7C is provided with twelve communicating holes 221 and eleven facing portions. The first facing portions with a narrow facing distance are equivalent to five even-numbered facing portions from the left of the drawing and the second facing portions with the wide facing distance D2 are equivalent to six odd-numbered facing portions from the left of the drawing. The first facing portions may be formed so that the width of a middle portion in the width direction is narrower than an end portion in the width direction of the parallel surface of the optical fiber. A facing distance D1 of the fourth and eighth facing portions is narrower than the facing distance D1 of the second and tenth facing portions from the left, and a facing distance D1 of the sixth facing portion is narrower than the facing distance D1.

When a linear speed is fast, a coating thickness between the optical fiber ribbon tends to be thicker between the cores in the middle portion than between the cores in the end portion in the width direction. However, by forming the first facing portion so that the middle portion in the width direction is narrower than the end portion in the width direction of the parallel surface of the optical fiber, it is possible to thinly maintain the thickness of the common coated layer formed even in the middle portion in the width direction by the facing portions including a narrow facing distance.

For the optical fiber ribbon according to the embodiment of the present invention, a case in which the predetermined number equal to or greater than 2 is two has been described, but another number may be used as long as the number is an integer equal to or greater than 2. Similarly, for the die, a case in which the predetermined number equal to or greater than 2 is two has been described, but another number may be used as long as the number is an integer equal to or greater than 2.

REFERENCE SIGNS LIST

10, 10: optical fiber ribbon
11, 11a to 11e: optical fiber
12, 12: common coated layer
13: glass fiber
13a: core
13b: clad
14: protection coating
15: colored layer
16a, 16b: depression portion
17: cut
18, 19: connection portion
20: die
21: hole
22: facing portion
31: intermittent connection portion
32: continuous connection portion
100: supply device
101 to 106: reel
111 to 116: dancer roller
120: guide roller
130: right above guide roller
200: application device
210: nipple
211: outbound line slit
220: die
221, 221a to 221f hole
222a, 222b, 222c, 222d: facing portion
230: resin tank
240: ultraviolet irradiation device
250: guide roller
310: feeding capstan
320: winding tensile force control dancer roller
330: winding device
400: intermittent processing device

The invention claimed is:

1. An optical fiber ribbon in which a plurality of optical fibers are integrated by a common coated layer, the optical fiber ribbon comprising:

an intermittent connection portion in which a connection portion formed from the common coated layer and a non-connection portion including no common coated layer are alternately formed in a longitudinal direction between every predetermined number of optical fibers equal to or greater than two; and a continuous connection portion in which a connection portion formed from the common coated layer is continuously formed in a longitudinal direction between optical fibers other than the predetermined number of optical fibers equal to or greater than two, wherein a thickness of the connection portion of the intermittent connection portion, which is formed by performing a cutting process to the common coated layer after coating the plurality of optical fibers by the common coated layer, is thinner than a thickness of the continuous connection portion, wherein the intermittent connection portion has a first depressed portion and the continuous connection portion has a second depressed portion, and the first depressed portion is deeper than the second depressed portion.

2. The optical fiber ribbon according to claim 1, wherein a difference between the thickness of the continuous connection portion and the thickness of the connection portion of the intermittent connection portion is at least 20 μm or more.

3. A method for manufacturing an optical fiber ribbon in which a plurality of optical fibers are integrated by a common coated layer, the optical fiber ribbon including: an intermittent connection portion in which a connection portion formed from the common coated layer and a non-connection portion including no common coated layer are alternately formed in a longitudinal direction between every predetermined number of optical fibers equal to or greater than two; and a continuous connection portion in which a connection portion formed from the common coated layer is continuously formed in a longitudinal direction between optical fibers other than the predetermined number of optical fibers equal to or greater than two, the method comprising:

coating the plurality of optical fibers by the common coated layer such that:

a portion of the common coated layer which becomes the connection portion of the intermittent connection portion has a first depressed portion;

a portion of the common coated layer which becomes the continuous connection portion has a second depressed portion;

the first depressed portion is deeper than the second depressed portion; and a thickness of the portion of the common coated layer which becomes the connection portion of the intermittent connection portion is thinner than a thickness of the continuous connection portion; and forming the intermittent connection portion by performing a cutting process to the common coated layer.

* * * * *